United States Patent
Zhang et al.

(10) Patent No.: US 10,338,895 B2
(45) Date of Patent: Jul. 2, 2019

(54) INTEGRATED DEVELOPER ENVIRONMENT FOR INTERNET OF THINGS APPLICATIONS

(71) Applicant: Cisco Technology, Inc., San Jose, CA (US)

(72) Inventors: Yajun Zhang, Santa Clara, CA (US); Haihua Xiao, Shanghai (CN); Rizhi Chen, Shanghai (CN); Ashutosh A. Malegaonkar, Milpitas, CA (US); Wael Kamel, San Jose, CA (US); Aikepaer Abuduweili, San Jose, CA (US); Susie Wee, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 385 days.

(21) Appl. No.: 15/176,746

(22) Filed: Jun. 8, 2016

(65) Prior Publication Data

US 2016/0357521 A1    Dec. 8, 2016

Related U.S. Application Data

(60) Provisional application No. 62/172,464, filed on Jun. 8, 2015.

(51) Int. Cl.
*G06F 9/44* (2018.01)
*G06F 8/34* (2018.01)
(Continued)

(52) U.S. Cl.
CPC .............. *G06F 8/34* (2013.01); *G06F 8/60* (2013.01); *G06F 9/455* (2013.01)

(58) Field of Classification Search
None
See application file for complete search history.

(56) References Cited

U.S. PATENT DOCUMENTS

| 8,612,197 B1* | 12/2013 | Johnson ............. G06F 17/5022 703/13 |
| 2014/0201256 A1* | 7/2014 | Pinheiro ........... H04M 1/72533 709/201 |

(Continued)

OTHER PUBLICATIONS

Kefalakis, et al., "Open source blueprint for large scale self-organizing cloud environments for IoT applications" Seventh Framework Programme Specific Targeted Research Project; D4.4.2 OpenIoT Integrated Development Environment b; Ref. Ares(2014)2606668—Jun. 8, 2014; pp. 1-78.

(Continued)

*Primary Examiner* — Qamrun Nahar
(74) *Attorney, Agent, or Firm* — Behmke Innovation Group LLC; James Behmke; Stephen D. LeBarron

(57) ABSTRACT

In one embodiment, a graphical user interface (GUI) is established for an Internet of Things (IoT) integrated developer environment (IDE) with one or more visual developer tools. Real and/or virtual nodes are provided within the IoT IDE having connectivity and functionality, and a plurality are connected as a logical and executable graph for a flow-based programming framework virtualized across one or more IoT layers. The nodes may then be programmed based on respective connectivity and functionality, such that the logical and executable graph has real and/or virtual inputs, real and/or virtual processing functions, and real and/or virtual actions. Upon deploying the node programming to one or more corresponding platform emulators configured to execute the node programming, the logical and executable graph may be simulated by executing the node programming to produce the one or more actions based on the one or more inputs and the one or more processing functions.

17 Claims, 15 Drawing Sheets

(51) Int. Cl.
  *G06F 8/60* (2018.01)
  *G06F 9/455* (2018.01)

(56) References Cited

U.S. PATENT DOCUMENTS

2014/0359552 A1  12/2014  Misra et al.
2015/0113172 A1   4/2015  Johnson et al.

OTHER PUBLICATIONS

Schwaderer, Curt, "Embedded IDEs shaped by Internet of Things, DIY, virtualization, multicore" Embedded Computing Design; Jun. 18, 2014; pp. 1-6.
Tywoniak, Rick, "The Extended Cisco Partner Ecosystem", Let's Build Tomorrow Today, PSODEV-1001, 2015, pp. 1-42, Cisco Live.

* cited by examiner

INTEGRATED DEVELOPER ENVIRONMENT FOR INTERNET OF THINGS APPLICATIONS

RELATED APPLICATION

The present application claims priority to U.S. Provisional Appl. No. 62/172,464, filed on Jun. 8, 2015 for INTEGRATED DEVELOPER ENVIRONMENT FOR INTERNET OF THINGS APPLICATIONS, by Zhang, et al., the contents of which are hereby incorporated by reference.

TECHNICAL FIELD

The present disclosure relates generally to computer networks, and, more particularly, to an integrated developer environment (IDE) for Internet of Things (IoT) applications.

BACKGROUND

The "Internet of Things" (IoT), also referred to as the "Internet of Everything" (IoE), represents the next big industrial transformation taking place in computer networking today. While the space is still forming, it is clear that a developer ecosystem and developer experience play an essential role for this transition. That is, IoT and IoE developers are still learning what is an IoT/IoE architecture, and how to efficiently develop an IoT/IoE application and/or technology within a part of the IoT/IoE stack.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
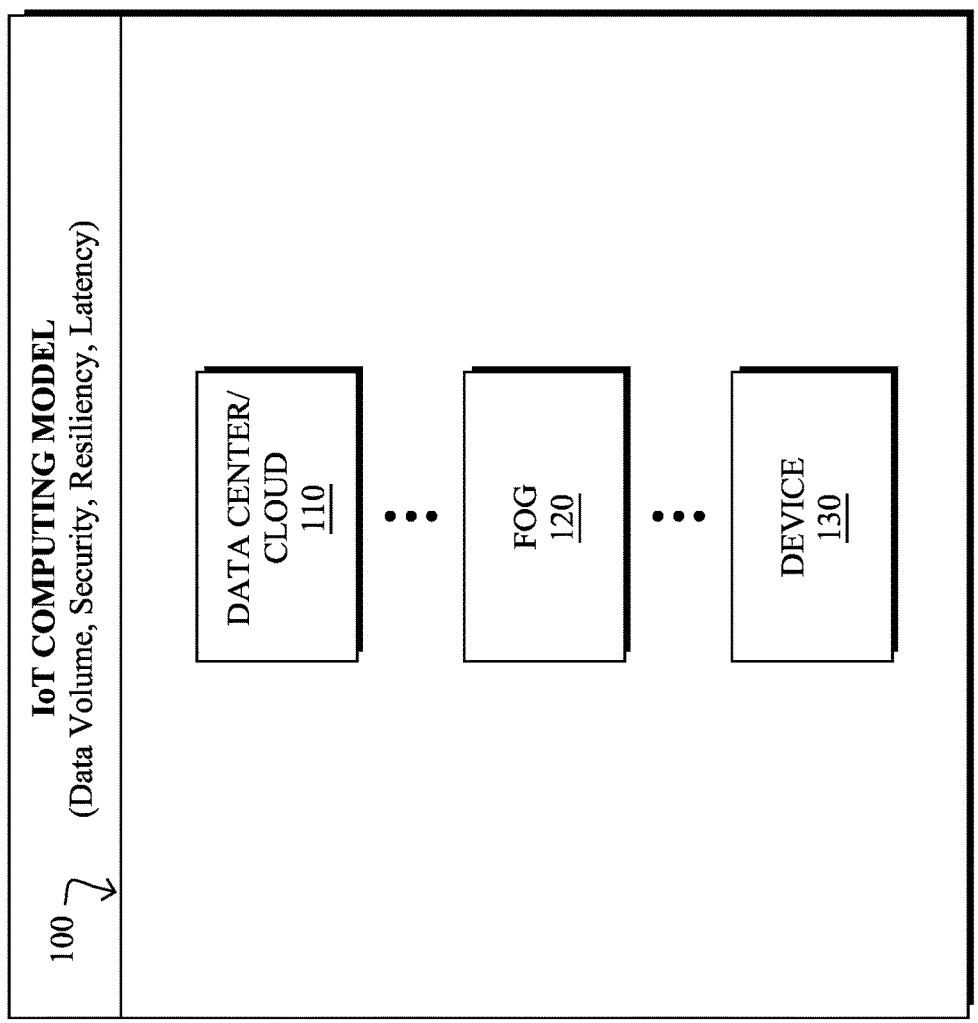
FIG. 1 illustrates an example computing model for IoT.

According to one or more embodiments of the disclosure, an integrated developer environment (IDE) for Internet of Things (IoT) applications is shown and described. In particular, in one embodiment, a graphical user interface (GUI) is established for an Internet of Things (IoT) integrated developer environment (IDE) with one or more visual developer tools. Nodes are provided within the IoT IDE having connectivity and functionality, where the nodes selected from a) discovered real nodes in communication with the IoT IDE or b) virtual nodes within the IoT IDE, and a plurality are connected as a logical and executable graph for a flow-based programming framework virtualized across one or more IoT layers. The nodes may then be programmed based on respective connectivity and functionality, such that the logical and executable graph has one or more real and/or virtual inputs, one or more real and/or virtual processing functions, and one or more real and/or virtual actions. Upon deploying the node programming to one or more corresponding platform emulators configured to execute the node programming, the logical and executable graph may be simulated by the IoT IDE by executing the node programming to produce the one or more actions based on the one or more inputs and the one or more processing functions.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Loosely, the term "Internet of Things" (IoT) or "Internet of Everything" (IoE) refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

As mentioned above, the IoT/IoE represents an industrial transformation where a developer ecosystem and a developer experience are still being established. In particular, as noted, IoT and IoE developers are still learning what is an IoT/IoE architecture, and how to efficiently develop an IoT/IoE application and/or technology within a part of the IoT/IoE stack.

As an illustration, an IoT/IoE architecture 100 may comprise various layers, such as shown in FIG. 1, which comprise a cloud computing layer 110, a fog computing layer 120, and a device layer 130. Though cloud computing is relatively well-known, fog computing is a paradigm that extends cloud computing to the edge of the network, where similar to the cloud, the fog provides data, computing, storage, and application services to end users, but closer to the devices or "things" (objects, sensors, actuators, etc.). In particular, fog computing supports emerging IoT applications that demand real-time/predictable latency (e.g., industrial automation, transportation, networks of sensors and actuators, etc.), and thanks to its wide geographical distribution is well positioned for real-time big data and real-time analytics.

For today's application developers, there are several pain points and challenges in developing and deploying IoT applications.

A first example challenge is device readiness. IoT/IoE requires a number of physical devices including endpoint and sensing devices and network equipment such as edge routers and wireless equipment. In most cases, developers have to wait for all the devices to arrive before they start programming. This challenge is more severe especially when using expensive and/or unfamiliar technologies.

A second example challenge is in creating sensors, both physical and virtual, in the development environment. The developer may have a number of physical sensors and may want to emulate a larger number of virtual sensors to use in their application.

Figure 2:
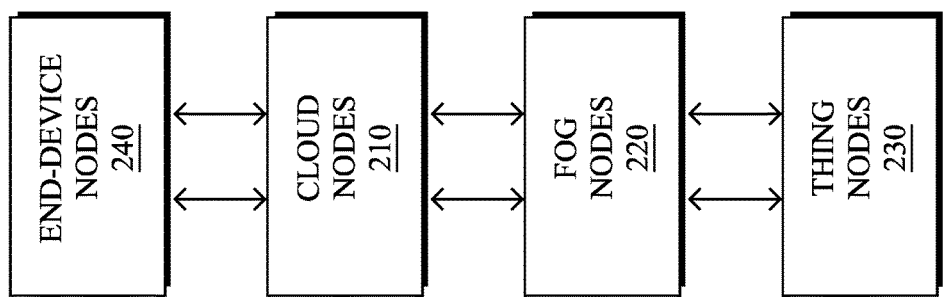
FIG. 2 illustrates an example layered application architecture in one typical IoT application.

A third example challenge is in regard to a layered/distributed IoT architecture, as shown in FIG. 1 above, and also in FIG. 2 (The layered application architecture 200 in one typical IoT application, which involves thing nodes 230, Fog nodes 220, Cloud nodes 210, and end-user nodes 240. Though it provides application developers an opportunity to leverage edge computing, such an architecture also adds more complexity to the whole system, which means that application developers need to put some pieces of logic to certain edge devices and other pieces of logic to somewhere else, and that there isn't one place to gain the overview of all the logics and codes.

A fourth example challenge is design verification before rollout. Because IoT applications (especially industry IoT applications) usually involve a large scale of devices and data, it can be very difficult to perform system testing to verify the design. Application developers may have some devices in the labor but it is extremely difficult if not impossible to mimic the real world situation with just a handful lab devices. For example, you cannot verify your logic for a smart city solution just by using a couple routers and a handful of sensors—the event and data patterns won't match up.

The present disclosure describes an integrated developer environment (IDE) for IoT application developers (also referred to as a "developer accelerator environment"), which improves the IoT developer and operator experience. The illustrative IDE is designed to address the developer challenges of IoT applications with layered/distributed architecture (e.g., cloud, network, fog, devices, etc.), and is aligned with the various aspects of an overall IoT architecture, including things, edge computing, IoT platform as a service (PaaS), and end user devices.

In particular, in the proposed integrated developer environment, various services, tools, etc., are provided for platform emulations, data-flow protocol/algorithm simulation, live management, and so on. With this single environment, developers can easily program even for different thing/fog/cloud platforms, and can also simulate the developed IoT application/service without deploying to real things/Fogs/Clouds/devices. Additionally, the illustrative IDE is not a closed system, and can be configured to leverage and connect to third-party resources, which can include sensor simulation libraries, virtual smart things, cloud services, etc.

Integrated Developer Environment (IDE) for
Internet of Things (IoT) Applications An IoT application or "app" typically involves many layers of devices and services, such as the sensors and actuators, the routers, fog-based processing, cloud-based processing, etc. Considering each of these layers when writing an IoT app can be a difficult task, in terms of both interoperability within each layer as well as interoperability across the layers.

Figure 3:
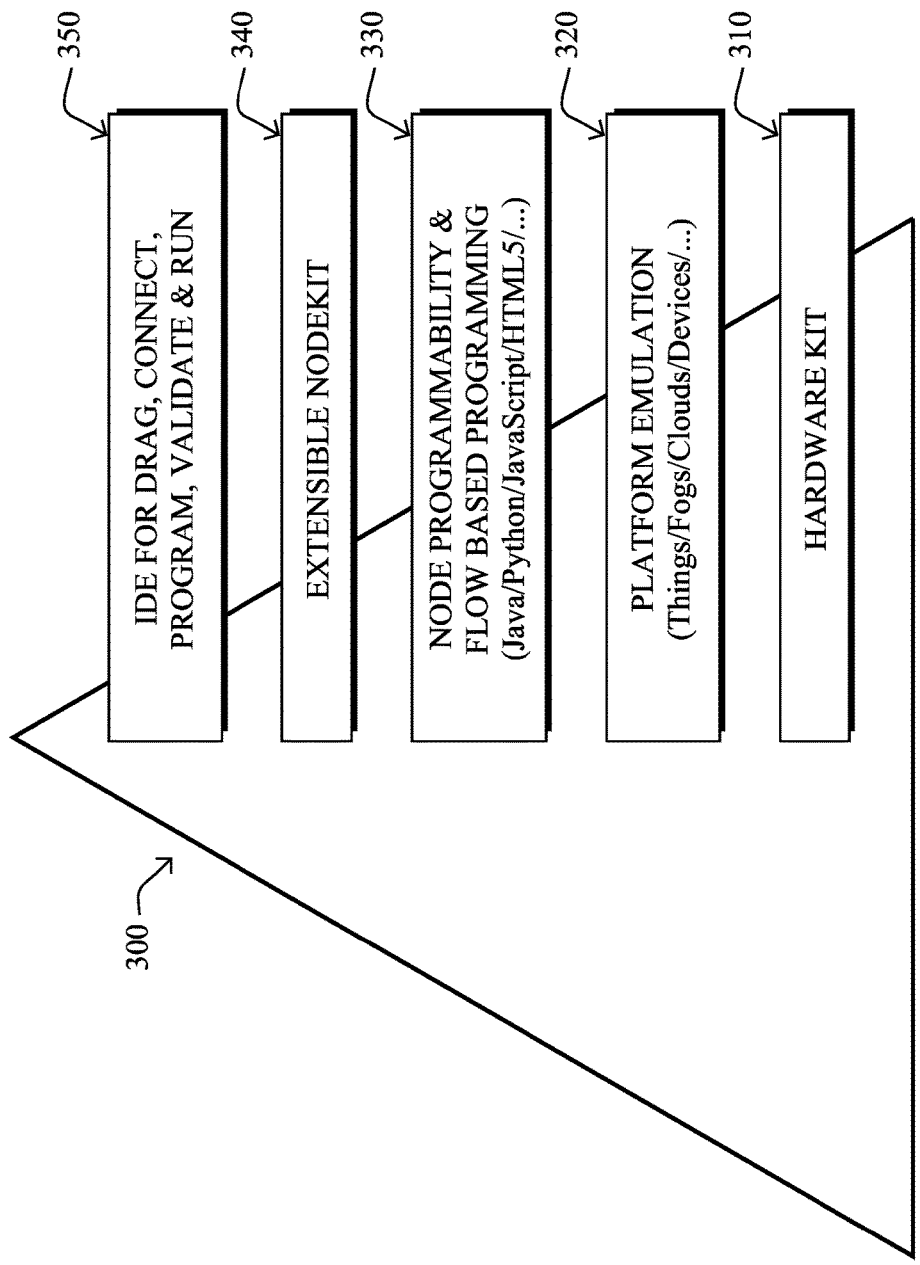
FIG. 3 illustrates an example architecture hierarchy of an IoT IDE.

The embodiments herein, therefore, define a developer accelerator environment, or "integrated developer environment" (IDE), to improve the IoT developer experience. With reference to FIG. 3, various functionalities of the developer environment (architecture hierarchy 300) may comprise a hardware kit 310, platform emulation 320, flow-based programming framework 330 for node programmability, an extensible node-kit 340, and visual developer tools 350 (e.g., drag, connect, program, validate, run, etc.), as described below. In particular, an IDE specific to IoT combines the use of real-world physical devices and virtualized devices (in any degree of the spectrum from all virtual devices to all real-world devices), and allows for virtualization across all layers (from physically sensed data to network functionality to applications). As described below, layers that are not part of the developer's interest may be abstracted (e.g., not caring about the sensed data, or not caring about the network connectivity, etc.) to allow a simplified build of logical interconnectivity for the virtualization. Access to real devices through discovery, a library of known or general devices/services (and their behaviors), and other features make this a robust tool for IoT developers. Also, in one embodiment, algorithms for auto-placement and auto-connection of logical "blocks" are also described. Furthermore, a number of associated user interface gestures are described to allow a user to interact with the IDE of IoT, in particular for touchscreen implementations. Notably, the IDE may be used for "developing" or "programming" an IoT application, and also for "operating" the IoT application, thus providing a "DevOps" tool for IoT applications.

Specifically, according to one or more embodiments herein, a graphical user interface (GUI) is established for an Internet of Things (IoT) integrated developer environment (IDE) with one or more visual developer tools. Nodes are provided within the IoT IDE having connectivity and functionality, where the nodes selected from a) discovered real nodes in communication with the IoT IDE or b) virtual nodes within the IoT IDE, and a plurality are connected as a logical and executable graph for a flow-based programming framework virtualized across one or more IoT layers. The nodes may then be programmed based on respective connectivity and functionality, such that the logical and executable graph has one or more real and/or virtual inputs, one or more real and/or virtual processing functions, and one or more real and/or virtual actions. Upon deploying the node programming to one or more corresponding platform emulators configured to execute the node programming, the logical and executable graph may be simulated by the IoT IDE by executing the node programming to produce the one or more actions based on the one or more inputs and the one or more processing functions.

With regard to the hierarchical levels indicated in FIG. 3, the hardware kit 310 provides a hardware platform which enables developers to start creating simple applications. This may be targeted towards consumer applications, but preferably toward enterprise applications. This hardware kit will not only enable various sensors but will also enable some location service emulation. This platform will be the first step in getting various users or startups programming with the IoT IDE ecosystem.

For platform emulation 320, the platforms to be emulated may include the things (e.g., sensors, actuators, etc.), the Fog platform, the Cloud platform, and the end-user platforms (e.g., Web). Notably, for the things, it is not easy to emulate different things from individual vendors. In one embodiment, therefore, the techniques herein may provide one format specification to standardize about how to specify the functionalities and the interfaces of the virtualized things. Then based on the format specification, thing vendors could provide their virtualized products such that the things could be emulated in the developer environment. For instance, if a particular format "X" is used to describe the virtualized thing, then the developer environment herein can import the "X" file to simulate the thing under the corresponding runtime. Then the thing vendor could use format "X" to design their products and provide customers virtualized samples. Notably, with the emulated platforms, developers can simulate the business logics in individual platforms, and also the data-flow protocol compliance between platforms.

For the node programmability and flow based programming framework 330, the "node" stands for the computing node in different hierarchical levels. It can be one virtualized thing, one Fog node, or one Cloud node. In a lower level, the node could be one MQTT client, one filter, or one data visualization sink. The developer environment herein provides the ability to enable the developers easily to program on these computing nodes using modern programming languages such as Java/Python/JavaScript/etc.

Figure 4:
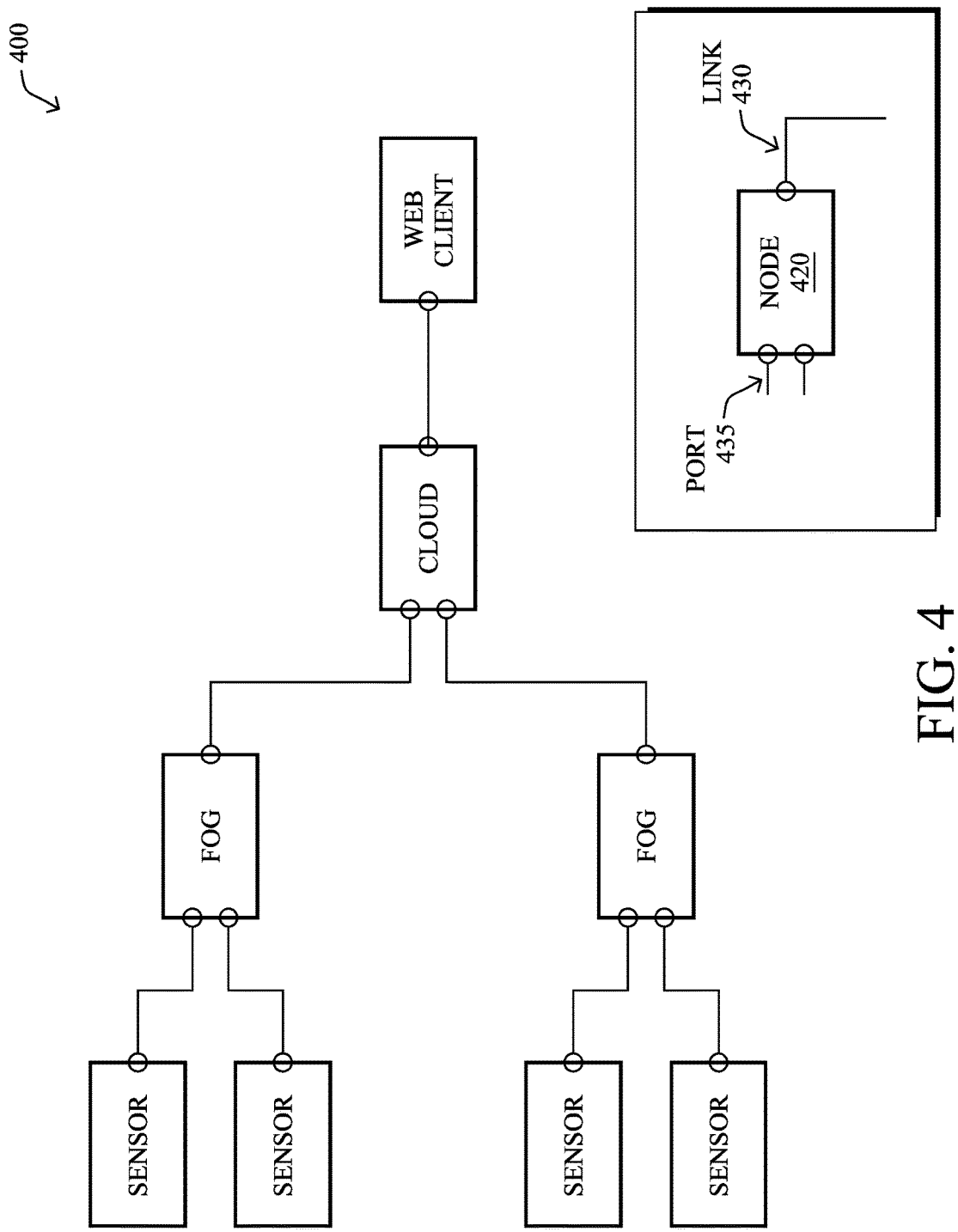
FIG. 4 illustrates an example showcase graph comprising nodes across layers and ports connecting nodes.
Figure 5:
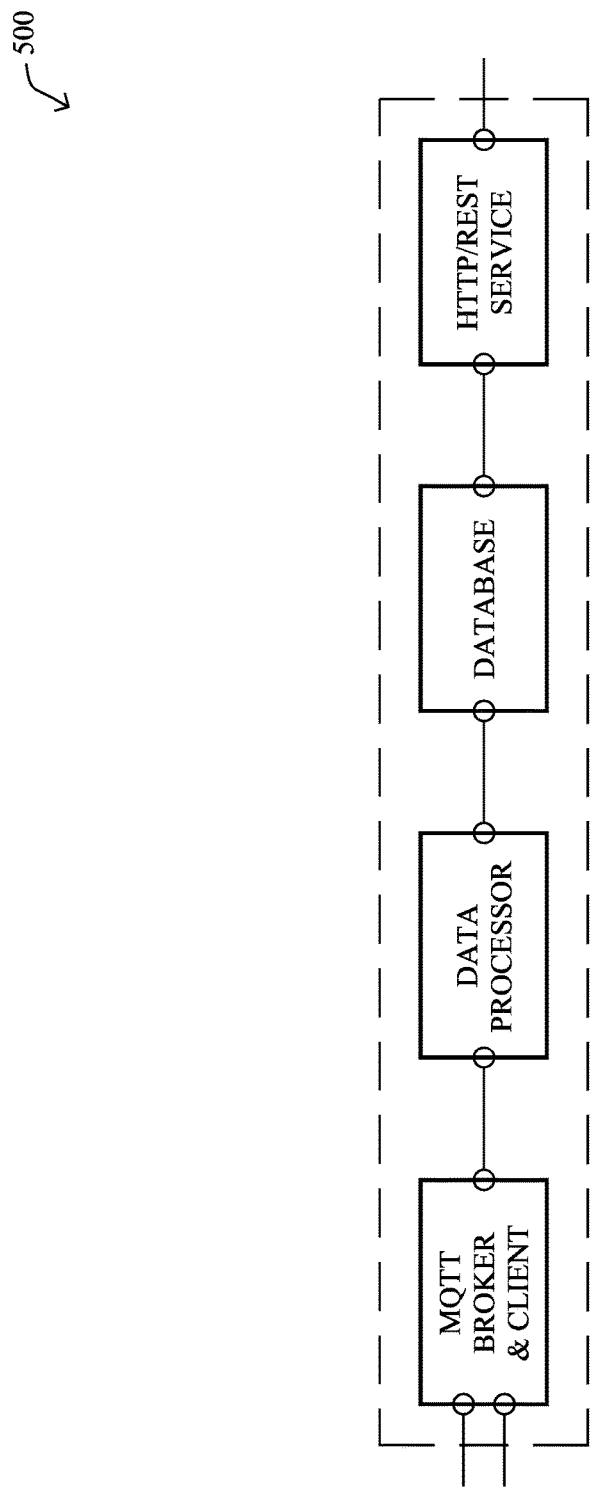
FIG. 5 illustrates an example showcase subgraph in a Fog computing node.

Due to the layered and distributed nature, the IoT application can be viewed as a network of asynchronous processes communicating by means of streams of structured data chunks, not as a single, sequential process. In this view, such as the graph 400 shown in FIG. 4, the focus is on the application data and the transformations applied to it for desired outputs, thus the IoT application architecture fits for the flow-based programming model. In this programming model, each node 420 in the data-processing pipeline may be taken as one separate process and communicates with each other by means of fixed-capacity connections 430. A connection may be attached to the process by means of a port 435, which has a protocol agreed between the processes. The protocols connecting the nodes across layers (things/fogs/clouds layers) can be the networking messaging communication protocols such as MQTT/CoAP/REST/RTP, as illustratively shown in FIG. 4. Also, the protocols connecting the nodes inside one layer can be memory buffers with customized formats, as well as networking protocols, as shown in the subgraph 500 in a fog computing node shown in FIG. 5.

The illustrative IoT IDE provides the flow-based programming framework to allow developers to program the nodes. The flow-based programming framework would include:
   a. Node registration service. The framework provides the service that allows developers to register their developed nodes as well as providing the nodes' metadata such as node name, node developer name, node description, the number of node input/output ports and their used protocols.
   b. Graph/sub-graph scheduling mechanism, which is to drive the running of the nodes in the graph/sub-graph.
   c. Base classes and software developer kits (SDKs) for programming on the nodes, ports and graph. Base classes provide some general interfaces for the nodes, ports and graph; SDKs are provided to allow programmably managing the nodes, ports and graphs, such as dynamically connecting/disconnecting the nodes, starting/stopping the nodes/graphs, or reporting the status of nodes.

Referring still to FIG. 3, the illustrative IDE provides an extensible node-kit 340 to store the implemented nodes which would be commonly used in IoT applications. For example, these nodes can include simulated data source (e.g., MQTT broker, HTTP/REST service), data processing filters and data sinks (e.g., MQTT client, HTTP/REST client). The node-kit support extensibility, and thus the developers can import and register their developed node into the kit.

Lastly, based on the platform emulation, the flow programming framework, and the node-kit, the IoT IDE provides visual developer tools 350 in the IDE for developers to easily program. Examples of such visual developer tools include dragging icons, connecting items logically, programming the items, validating the configurations, and running (executing) the system to obtain a result (virtualization, simulation, etc.).

Figure 6:
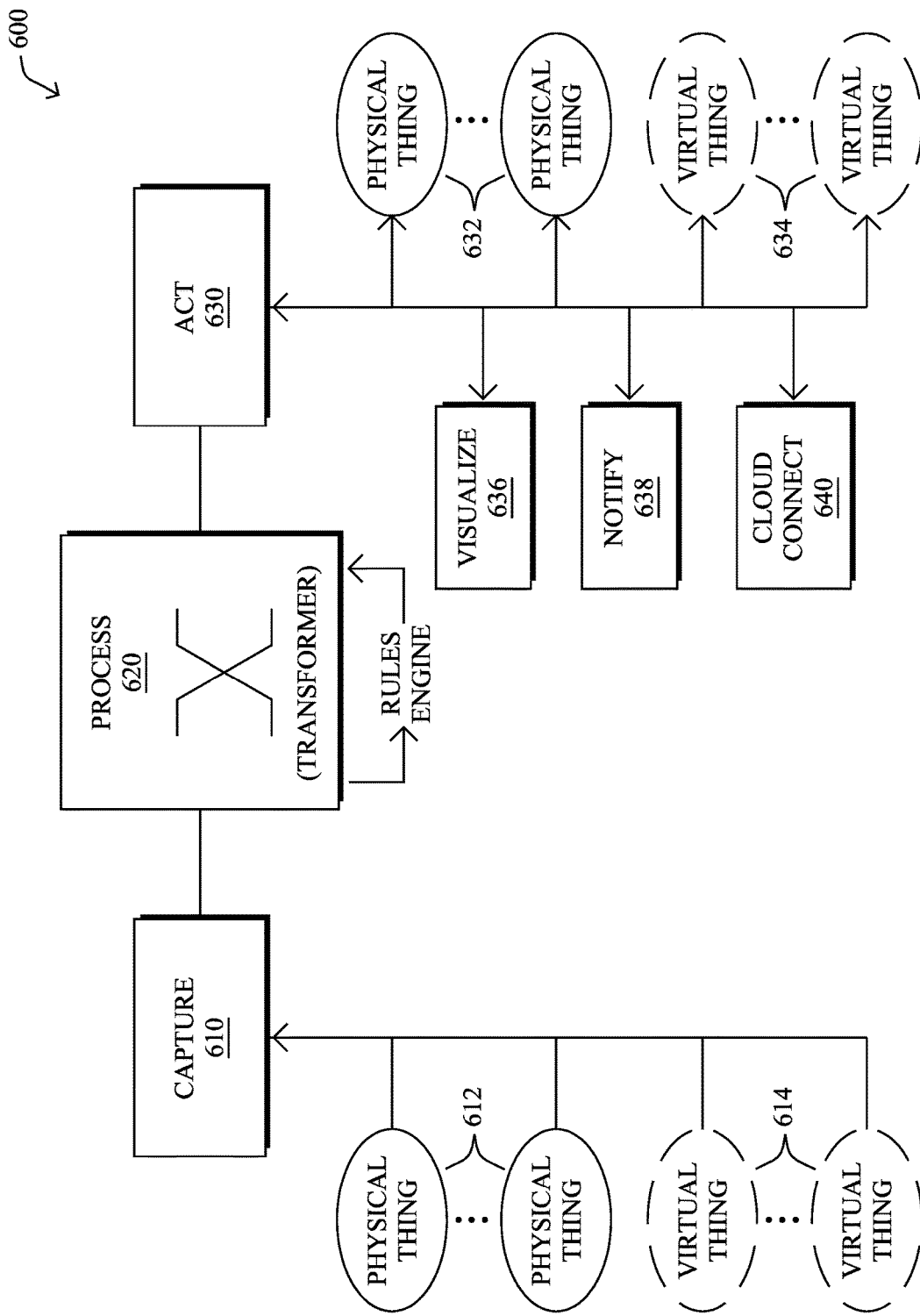
FIG. 6 illustrates an example functional diagram of an IoT IDE.

FIG. 6 illustrates an example functional diagram of the IoT IDE 600 described herein. In particular, the IDE allows developers to capture (610) inputs from any number of physical nodes/things (612) and/or virtual nodes/things (614) (e.g., objects, sensors, data producers, etc.), and processes the inputs (620) (e.g., transformations based on one or more rules engines) to result in one or more corresponding actions (630). Example actions include outputs to physical things (632) and/or virtual things (634) (e.g., objects, actuators, indicators, etc.), as well as various visualizations (636) (e.g., graphs, charts, values, etc.), notifications (638) (e.g., email, SMS, etc.), or cloud connections (640) (e.g., big data analysis, Internet sharing, database storage, etc.).

Figure 7:
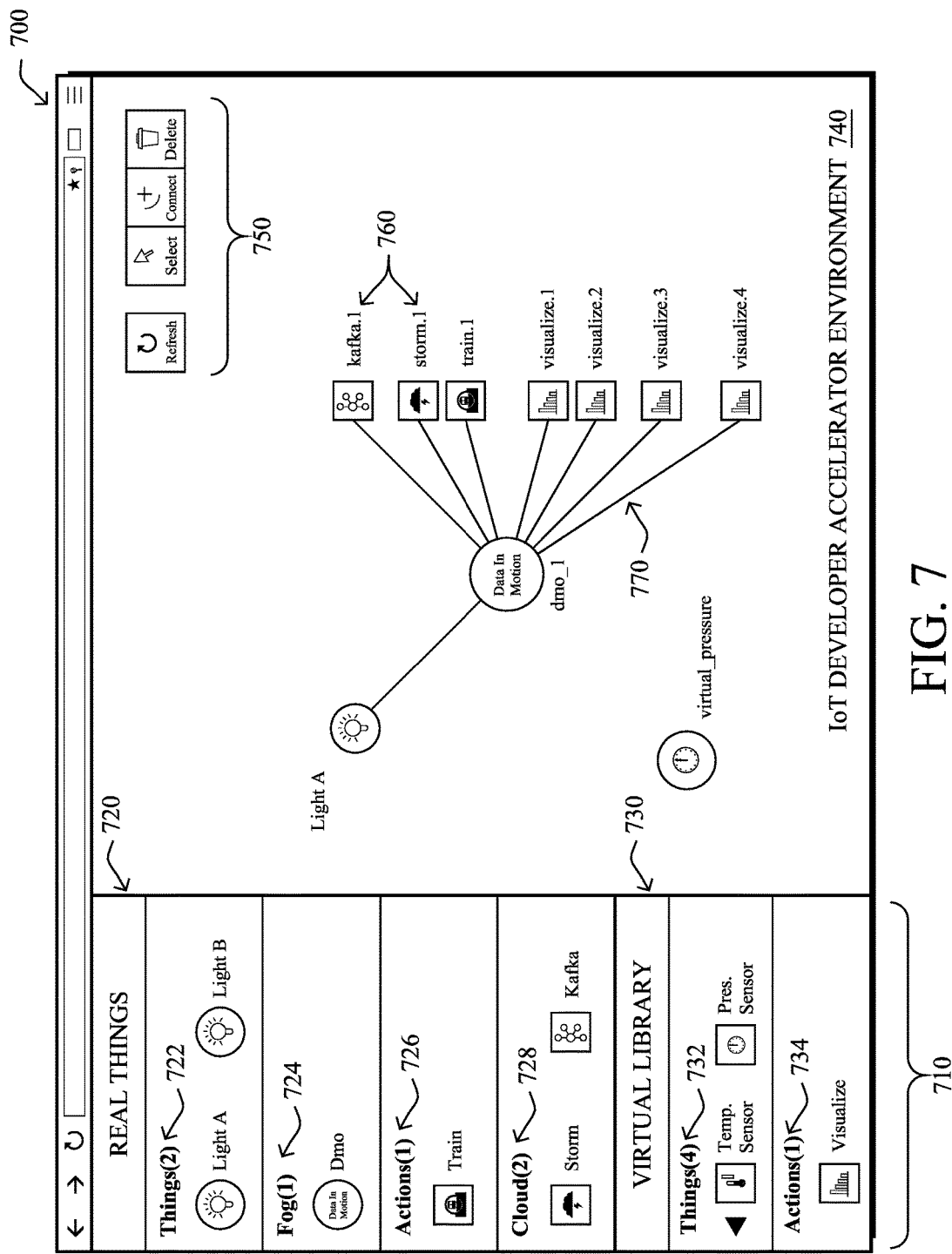
FIG. 7 illustrates an example graphical user interface (GUI) of an IoT IDE.

In addition, FIG. 7 illustrates an example graphical user interface (GUI) 700 for the illustrative IoT IDE. As an example, a menu 710 of "things" may comprise any number of real (physical) things 720, ranging from "things" 722 (e.g., IoT things, such as sensors, actuators, etc.), "fog" 724 (e.g., fog processing devices/logic), "actions" 726 (as mentioned above), and "cloud" 728 (e.g., cloud-based processes). Notably, the real things are actual devices connected to or otherwise accessible by the developer's programming system, such as devices connected through an I/O interface or else on the network in an accessible manner (e.g., the same network, on a public network, etc.). In addition, a library 730 of virtual things may comprise any number of virtual things 732, actions 734, etc., which are not actual devices, and are instead a selection of software-based virtualizations of real things. (As an example differentiation, a light as a real thing may be a physical light on the developer's desk, while a light as a virtual thing may simply be a software representation of a light turning on and off.)

The things, generally, can be placed and interconnected within the IoT Developer Accelerator Environment 740, which allows (menu 750) selecting, connecting, and deleting the objects (nodes 760) and their connections (770), and so on. As shown below, the interconnections and functionality/logic of the things may be programmed and simulated, all based on any combination of real (physical) and virtual inputs, real and virtual processing, and real and virtual outputs.

Figure 8:
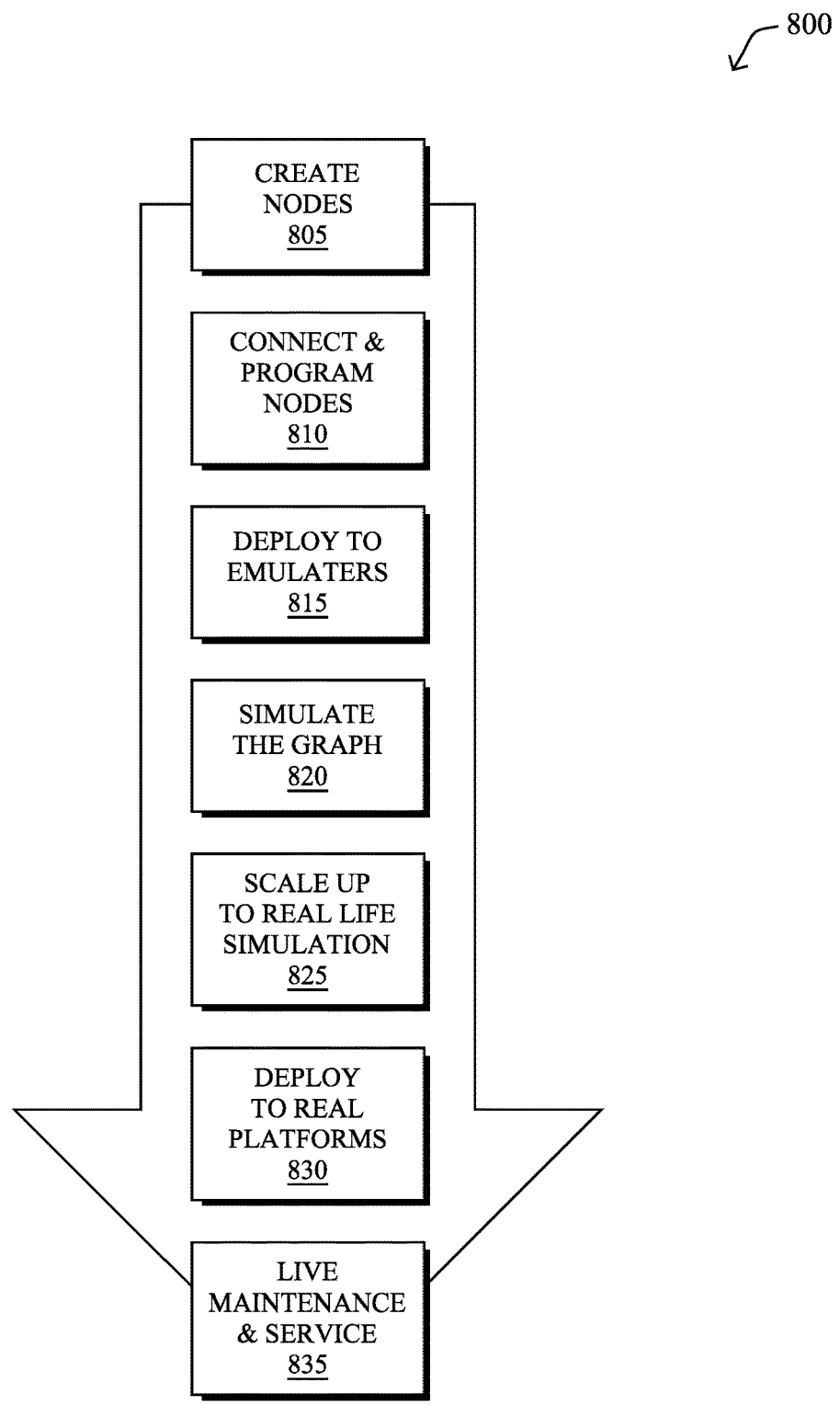
FIG. 8 illustrates an example workflow for an IoT IDE.

An example workflow for the described IDE for developing and evaluating an IoT application/system may include the steps shown in the flow 800 of FIG. 8. As described in greater detail below, such steps may include: creating nodes (805), connecting and programming nodes (810), deploying to emulators (815) and simulating the graph (820), scaling up to real life simulation (825), deploying to real platforms (830), and then live maintenance and service (835).

Figure 9:
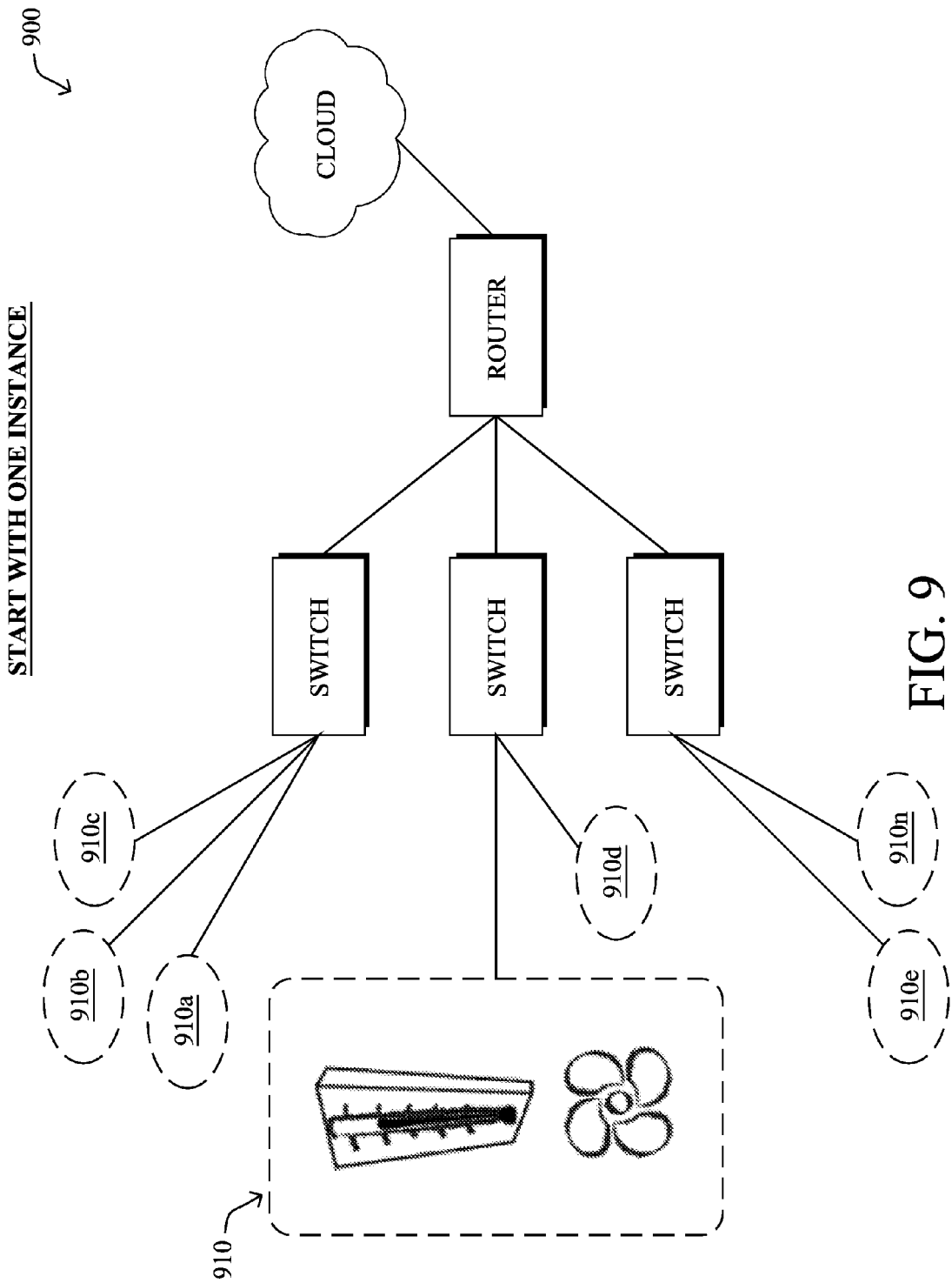
FIG. 9 illustrates an example block diagram with a single instance of a system.

To create nodes in the IDE, developers can either access virtual nodes from a node-kit which contains a pre-defined set of nodes and corresponding functionality, or they can also create new virtual nodes that define the numbers of input and output ports and functionality. Note that in some cases, developers might have a physical development board (e.g. Raspberry Pi) and physical sensors, or else may otherwise have access to other physical things. For example, as shown in FIG. 9, once the developer makes sure one instance 910 of the solution is working properly, they can switch to the IDE platform 900 for scale-up of the entire solution (instances 910*a-n*).

Figure 10:
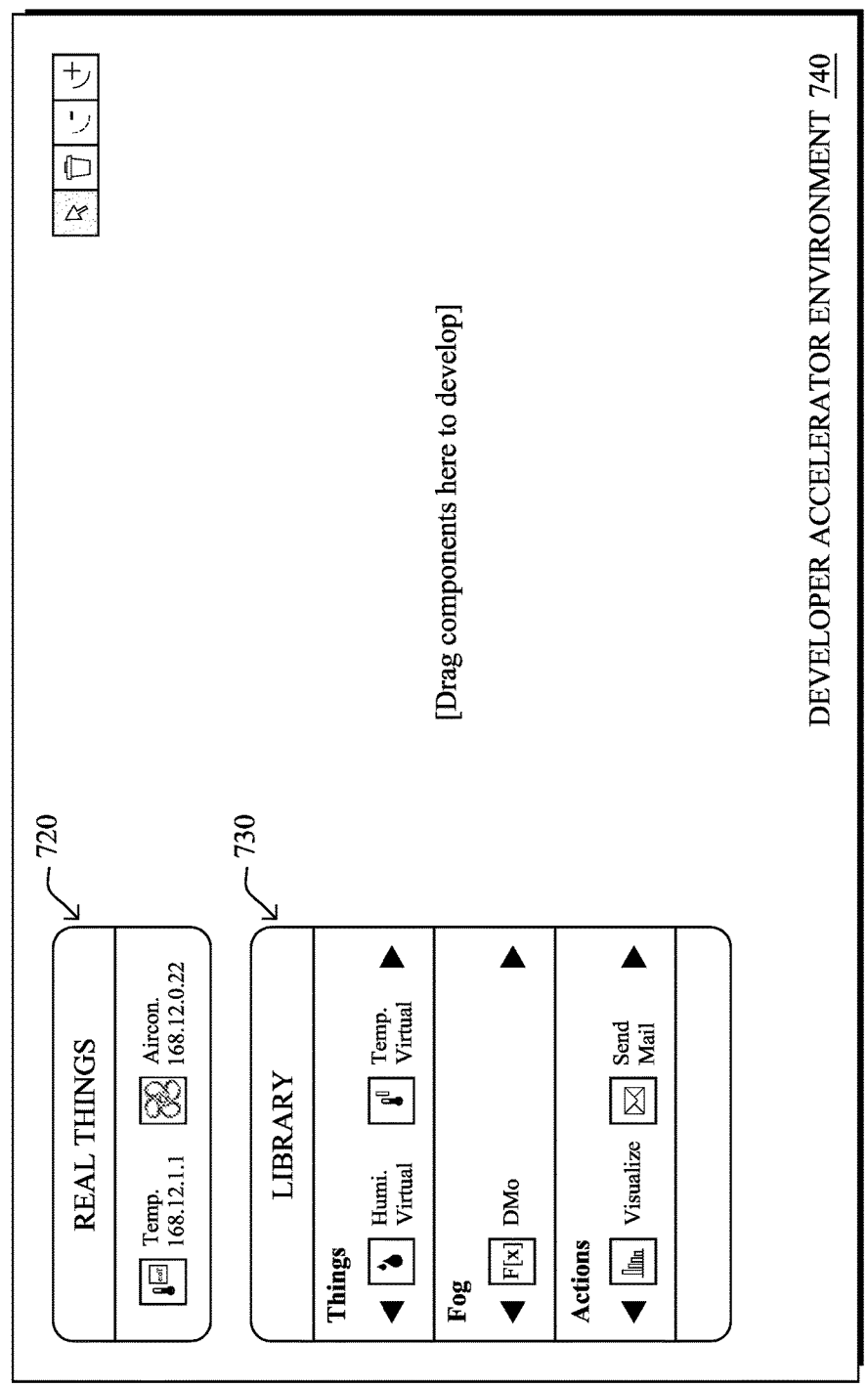
FIG. 10 illustrates an example auto-discovery of real things for an IoT IDE.

Additionally, there are environments in which various real devices may be otherwise accessible to the developer, such as over a computer network. In either case, the IDE platform also supports auto discovering the connected physical devices and auto creating the instances of these devices (as shown in the example 1000 of FIG. 10, populating the real things selection menu 720). In this manner, developers may have a streamlined experience for the hybrid workflow—starting with physical development board and sensors and switching to the virtual environment later on.

Note that the IDE allows developers to use nodes for any of the things/fogs/clouds layers, where these layers have different node implementations because of different runtime environments. For example, for the thing layer, the "Node.js" runtime environment may be used, which is lightweight and can be run in real low-cost hardware such as Raspberry Pi, while the nodes in the Fog layer may be run in the IOx runtime (available from Cisco Systems, Inc.), which would be simulated in the proposed environment. So even the nodes with the same functionality (e.g., MQTT client) but in different layers may be presented as different types of nodes.

Figure 11:
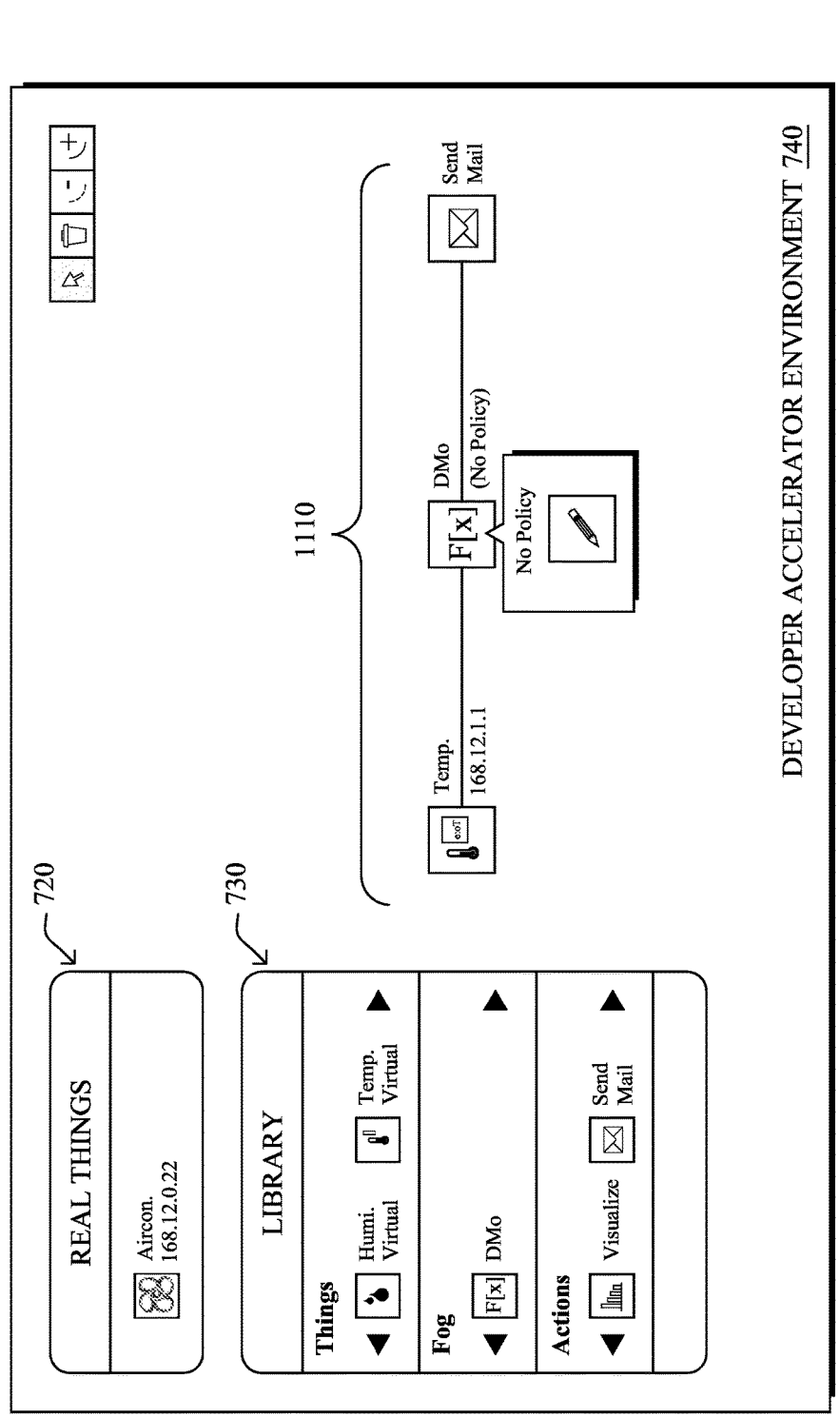
FIG. 11 illustrates an example canvas layout for an IoT IDE.

For connecting and programming nodes, as shown in view 1100 of FIG. 11, the IoT IDE allows developers to visually connect the ports between nodes and then compose them as an interconnected graph on the development "canvas" (1110, generally). Note that for standard networking protocols connecting nodes, e.g., MQTT, the IDE can automatically check for compliance between interconnected nodes and may auto-configure the parameters (e.g., configuring the broker IP address and port number in the MQTT client node).

In one embodiment, particularly for touchscreen implementations, algorithms are defined for auto-placement and auto-connection of the logical "blocks" (nodes). That is, the developer may be able to just select a node, and "flick" it in the general direction of the intended location, and the IoT IDE can determine where to connect the node within the graph based on various rules, e.g., based on input/output ports, how close they are on the canvas, etc. Similar functionality is available for auto-connection of the nodes based on proximity, that is, without the "flicking" motion. In other words, if two nodes are placed near each other that have appropriate "interconnectability" (e.g., a sensor and a sensor gateway), then the IoT IDE may automatically connect those two nodes. (Manual adjustment of the connections and locations are available to the developer in case such auto-placement and auto-connections are not actually the developer's intention.)

Figure 12:
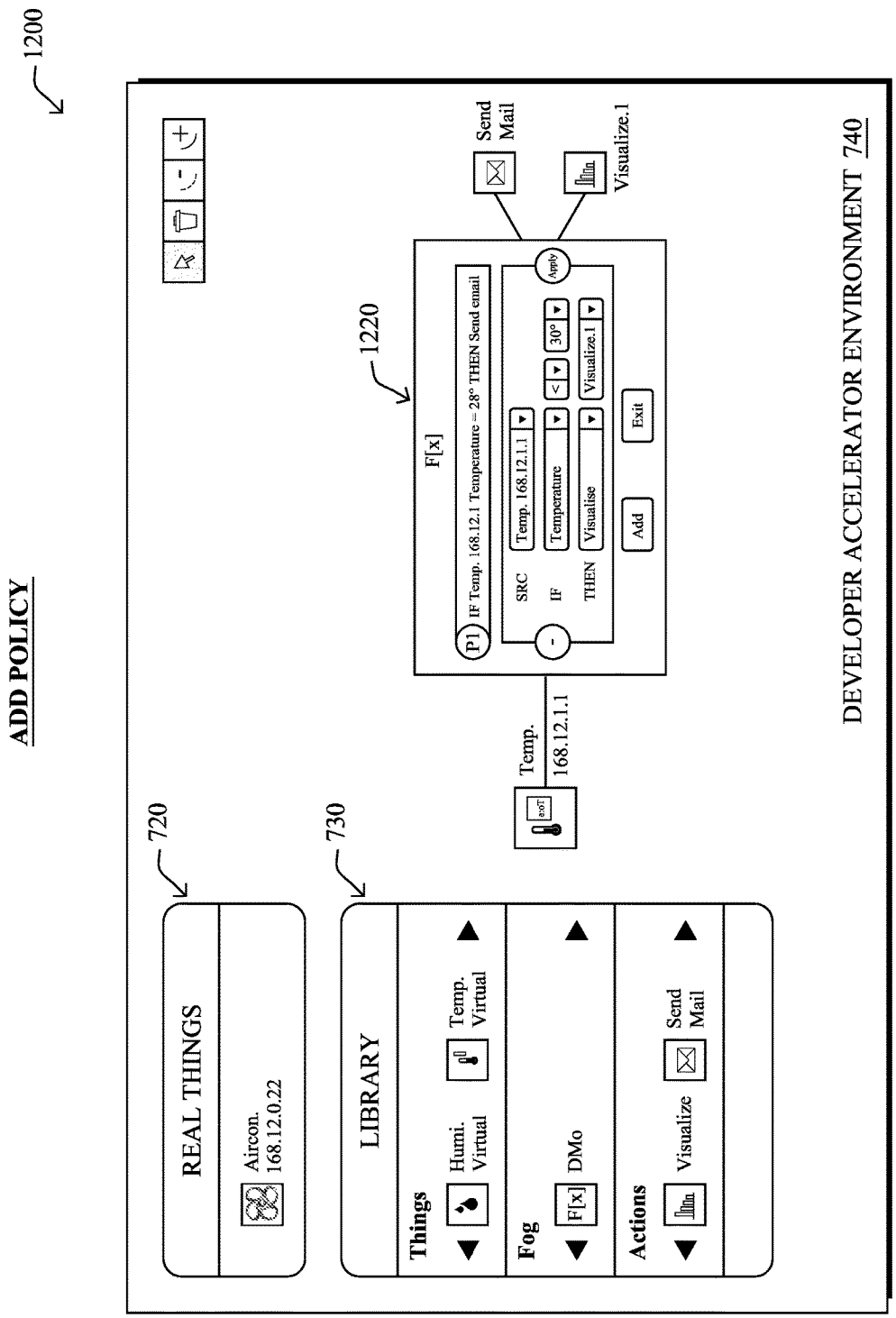
FIG. 12 illustrates an example policy editor for an IoT IDE.

As shown in the view 1200 of the GUI in FIG. 12, the IoT IDE also allows developers to easily provide functionality, write policies, and compile the nodes. (As mentioned above, language editing and building environments for things/fogs/clouds should be different due to different runtimes.) In general, by selecting a given node, such as a fog function node ("F[x]"), based on the inputs and outputs to/from the function node, the IoT IDE can populate various drop-down menus or other selections within a simplified logic programming window 1220 (FIG. 12) for programming by the developer.

More complex functionality may be programmed into the virtual nodes, and the view shown herein is merely for illustration. For instance, different people can work on different modules, such as highly-complex control systems, and then all of these different modules/nodes can be placed in the IoT IDE (e.g., an open API platform) and implemented in a single environment. In this manner, third-party developers are also allowed to write new components for addition to the thing libraries.

Note again the IoT IDE functions across IoT layers. Certain developers may actually only be interested in programming the sensors, while others may be interested in only the routers and/or fog layers, etc. Since it can be tremendously complicated to program an environment that spans across all the layers (from cloud down to devices), the IoT IDE can abstract certain layers that the developer is not interested in detailing, but that are needed for certain functionality. For instance, assuming that a developer is creating a fog function, he/she may not care about the actual protocol of the sensors, but instead merely requires input that mimics the sensors. Conversely, a developer may be creating a sensor/actuator device, and wants to test the functionality between sending data, and receiving instructions, but may not specifically require the detailed cloud/big data algorithms that determine how or when to provide such instructions based on whatever data.

Once the connections and logic/policies are defined, then the system from the GUI canvas can be deployed to emulators for simulation of the graph. That is, after the graph is formed, the IDE enables developers to deploy the nodes individually to emulation engines. For example, the thing node written above by JavaScript can be deployed to the node.js engine; the fog node could be deployed to the emulated IOx platform. Any appropriate animations can then be displayed to show the data flow and policy, and any visualizations (e.g., graphs, charts, messages, etc.), virtualized acts (e.g., lights turning on/off, actuators moving/activating, etc.) may also be presented within the IoT IDE.

Note that once a smaller graph is verified, such as a single logical grouping (e.g., a sensor, a controller, and an actuator), or a relatively small plurality of groupings (e.g., a plurality of sensors, a controller, and one or more actuators), the IoT IDE may be used to "scale-up" (or "scale-out") this smaller graph into a larger graph, which could be multiple instances of the same graph, or larger numbers of sensors, actuators, etc.

The tested and verified system (app, devices, logic controllers, etc.) may then be deployed to real platforms, i.e., after simulation (particularly on the scale-up scenario), the tested graph/system is ready to deploy to the real platforms (e.g., sending the reference design to manufacturers, etc.).

Figure 13:
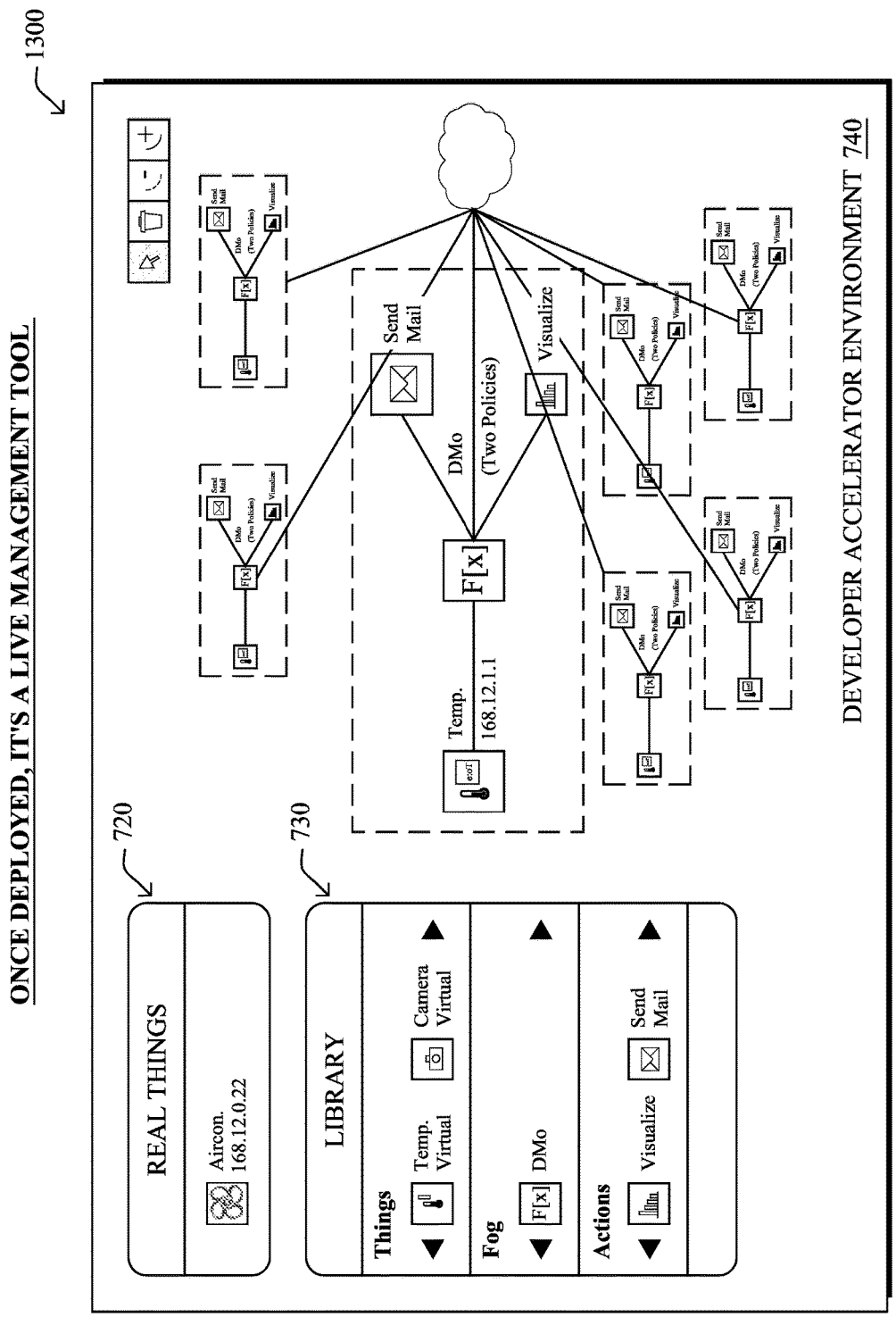
FIG. 13 illustrates an example live management of a system using an IoT IDE.

Once deployed in the real world, the IoT IDE may continue to be used for live maintenance and service, such as the illustrative view 1300 shown in FIG. 13. That is, after the solution is deployed to the real world, the IDE platform can keep monitoring the connected devices and the dataflow, hence acting as a live maintenance and service tool for the solution, where data can be monitored, sensors/actuators can be programmed, logic can be changed, etc. In other words, the IoT IDE can be used for developing an app (setting up logic with devices), and also for operating the system once deployed (working on real things, making things happen, etc.).

The proposed developer environment thus significantly improves the experience of IoT application developers, especially for ones with the Fog computing model. In particular, the IoT IDE herein allows for a workflow that can start with any number of real devices and any number of virtual devices, moving through development, testing, and redesign, through to actual deployment and maintenance with physical devices in the real world.

Figure 14:
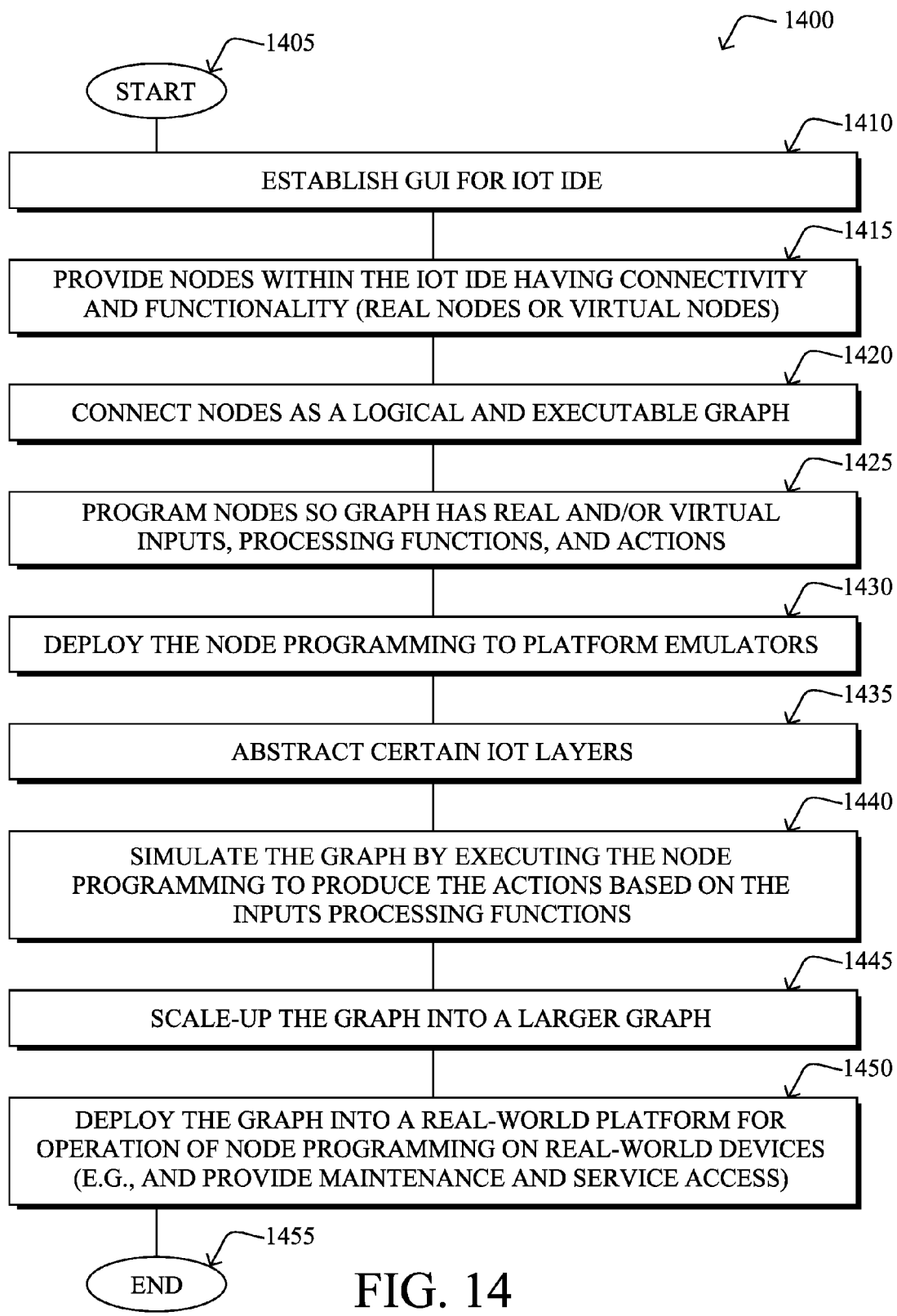
FIG. 14 illustrates an example simplified procedure for executing an IoT IDE in accordance with one or more embodiments described herein.

FIG. 14 illustrates an example simplified procedure for executing an IoT IDE in accordance with one or more embodiments described herein. The procedure 1400 may start at step 1405, and continues to step 1410, where, as described in greater detail above, a graphical user interface (GUI) is established for an Internet of Things (IoT) integrated developer environment (IDE) with one or more visual developer tools. In step 1415, the IoT IDE provides nodes within the IoT IDE having connectivity and functionality, where the nodes selected from a) discovered real nodes in communication with the IoT IDE or b) virtual nodes within the IoT IDE (e.g., virtual nodes in a library of the IoT IDE and/or virtual nodes defined by a developer operating the IoT IDE). Note that the GUI may provide visual programming options based on the connectivity and functionality of the nodes, as mentioned above. Also, as mentioned above, the GUI may be populated with generically connectable and functional nodes, such as sensors, actuators, actors, cloud-based processors, etc.

When connecting a plurality of the nodes in step 1420, as detailed above, the IoT IDE generates a logical and executable graph for a flow-based programming framework virtualized across one or more IoT layers. Notably, in one embodiment, the IoT IDE may check for input/output (I/O) compliance between any two of the nodes prior to allowing a logical connection between those two nodes. As also mentioned above, the IoT IDE may be configured to intelligently auto-place and auto-connect two or more nodes within the IoT IDE based on proximity of the two or more nodes to each other and based on their respective connectivity, as well as other factors that may dictate such intelligent auto-placements and auto-connections. (Manual adjustments may still be made by the user in such an embodiment.)

The nodes represented by the IoT IDE may then be programmed in step 1425 as detailed above, generally based on respective connectivity and functionality, such that the logical and executable graph has one or more real and/or virtual inputs, one or more real and/or virtual processing functions, and one or more real and/or virtual actions (e.g., outputs, visualizations, actuations, notifications, cloud-connected processing, etc.).

In step 1430, the IoT IDE deploys the node programming to one or more corresponding platform emulators configured to execute the node programming (e.g., thing emulators, fog emulators, cloud emulators, and end-user emulators). Note that as explained above, in step 1435 one or more of the IoT layers that are undeveloped by a developer may be abstracted in order to emulate functionality, thus producing an outcome necessary for remaining developed IoT layers (e.g., sensed values, actions, communication protocol operations, and so on).

When the logical and executable graph is simulated in step 1440 by executing the node programming by the IoT IDE, one or more actions are produced based on the one or more inputs and the one or more processing functions from the steps above. In general, the platform emulators cooperate to simulate the corresponding layers of the IoT application designed within the IDE, and may be configured to emulate protocol-level connectivity (e.g., specific message formats, sizes, data, etc.), and/or mere logical connectivity between nodes (e.g., temperature "T" is sent from device "A" to device "B", regardless of protocol used).

In certain embodiments, the IoT IDE may be used to scale-up the graph into a larger graph as described above (e.g., scaling-up the number of nodes, the number of subgraphs, etc.) in step 1445. In addition, in certain embodiments, in step 1450 the resultant graph may be deployed into a real-world platform for operation of node programming on one or more real-world devices (such as for providing maintenance and service access to the deployed graph in a real-time, real-world environment, e.g., a DevOps platform).

The procedure 1400 ends in step 1455, though notably may continue to operate from any step noted above, such as when new nodes are discovered or designed, where new connections are made, new programming configured, and so on.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an integrated developer environment (IDE) for Internet of Things (IoT) applications. While there have been shown and described illustrative embodiments that provide for specific examples of an integrated developer environment (IDE) for Internet of Things (IoT) applications, it is to be understood that various other adaptations and modifications may be made within the spirit and scope of the embodiments herein.

In addition, while certain protocols, programming environments, or software languages are shown or described, other suitable protocols may be used, accordingly.

Illustratively, the techniques described herein may be performed by hardware, software, and/or firmware, such as in accordance with various applications, devices, communication modules, etc. For instance, various processes/programs may include computer executable instructions executed by a processor to perform functions relating to the techniques described herein.

Figure 15:
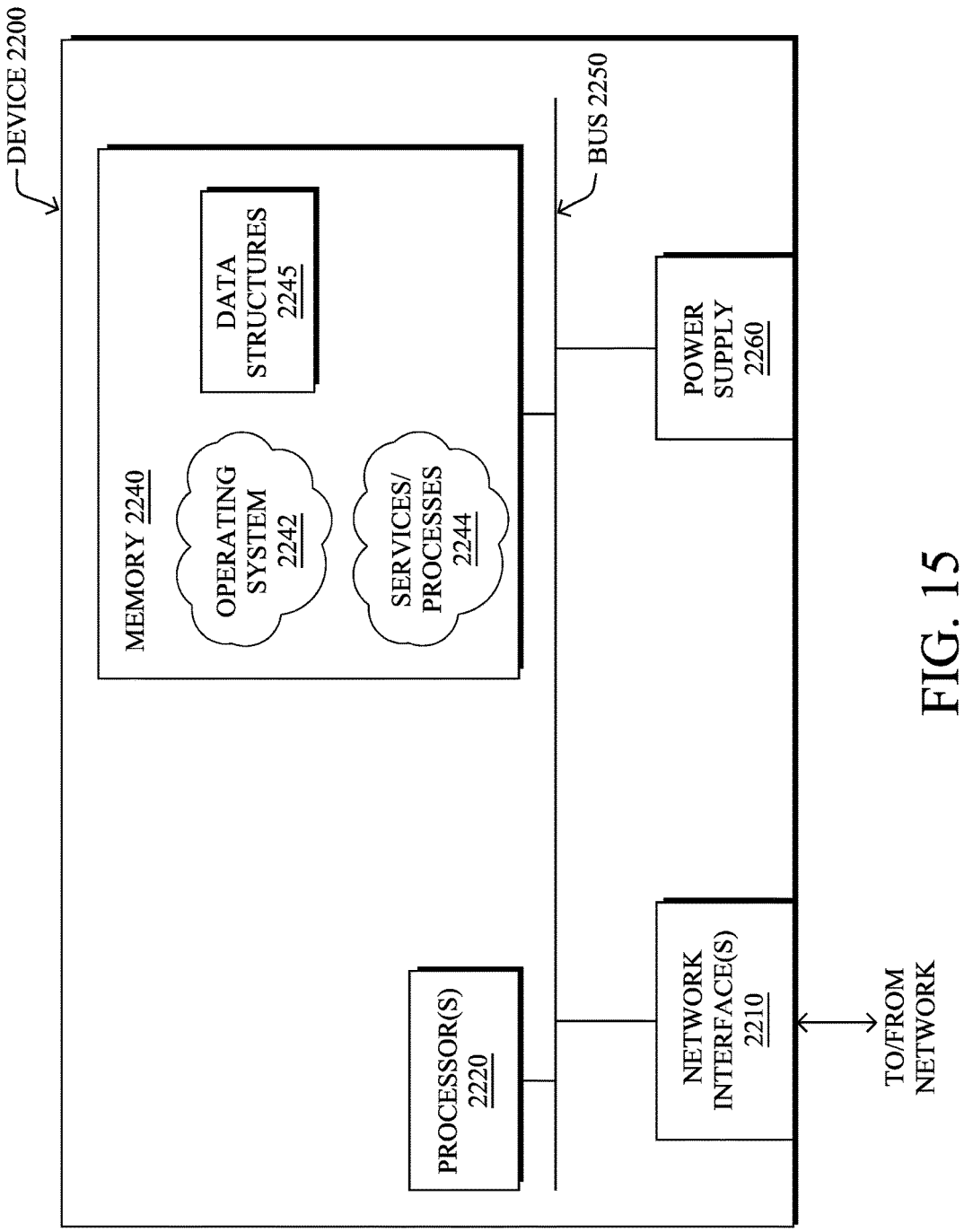
FIG. 15 illustrates an example device/node.

FIG. 15 is a schematic block diagram of an example node/device 2200 that may be used with one or more embodiments described herein, e.g., as any of the computing devices shown, described, or implied above. The device 2200 generally may comprise one or more network interfaces 2210, one or more processors 2220, and a memory 2240 interconnected by a system bus 2250, and is powered by a power supply 2260.

The network interfaces 2210 include the mechanical, electrical, and signaling circuitry for communicating data over physical links coupled to a computer network. The network interfaces may be configured to transmit and/or receive data using a variety of different communication protocols. Notably, a physical network interface may also be used to implement one or more virtual network interfaces, as will be understood by those skilled in the art. The memory 2240 comprises a plurality of storage locations that are addressable by the processor(s) 2220 and the network interfaces 2210 for storing software programs and data structures associated with the embodiments described herein. The processor 2220 may comprise necessary elements or logic adapted to execute the software programs and manipulate the data structures 2245. An operating system 2242, portions of which are typically resident in memory 2240 and executed by the processor(s), functionally organizes the node by, among other things, invoking network operations in support of software processes and/or services 2244 executing on the device. These software processors and/or services may comprise computer executable instructions executed by processor 2220 to perform various functionality as described above, and may interact with other processes/services 2244 within memory 2240 of the device 2200 or with processes/services of other devices.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    establishing, on a computer, a graphical user interface (GUI) for an Internet of Things (IoT) integrated developer environment (IDE) with one or more visual developer tools;
    providing, by the IoT IDE on the computer, nodes within the IoT IDE having connectivity and functionality, the nodes selected from a) discovered real nodes in communication with the IoT IDE or b) virtual nodes within the IoT IDE;
    connecting a plurality of the nodes, by the IoT IDE on the computer, as a logical and executable graph for a flow-based programming framework virtualized across one or more IoT layers that are undeveloped;
    programming nodes of at least one IoT layer of the one or more IoT layers, by the IoT IDE on the computer, based on respective connectivity and functionality, such that the logical and executable graph has one or more real and/or virtual inputs, one or more real and/or virtual processing functions, and one or more real and/or virtual actions;
    deploying, by the IoT IDE on the computer, the node programming to one or more corresponding platform emulators configured to execute the node programming; and
    simulating, by the IoT IDE on the computer, the logical and executable graph by executing the node programming to produce the one or more actions based on the one or more inputs and the one or more processing functions, the simulating including abstracting one or more of the IoT layers that are different than the at least one IoT layer by emulating functionality to produce an outcome necessary for remaining developed IoT layers.

2. The method as in claim 1, further comprising:
    scaling-up the graph into a larger graph.

3. The method as in claim 1, further comprising:
    deploying the graph into a real-world platform for operation of node programming on one or more real-world devices.

4. The method as in claim 3, further comprising:
    providing maintenance and service access to the deployed graph in a real-time, real-world environment.

5. The method as in claim 1, wherein platform emulators are selected from a group consisting of: thing emulators; fog emulators; cloud emulators; and end-user emulators.

6. The method as in claim 1, wherein simulating comprises:
    emulating protocol-level connectivity and/or logical connectivity between nodes.

7. The method as in claim 1, wherein actions are selected from a group consisting of:
    output; visualization; actuation; notification; and cloud-connected processing.

8. The method as in claim 1, wherein virtual nodes are selected from a group consisting of: virtual nodes in a library of the IoT IDE; and virtual nodes defined by a developer operating the IoT IDE.

9. The method as in claim 1, further comprising:
    checking for input/output (I/O) compliance between two of the nodes prior to allowing a logical connection between those two nodes.

10. The method as in claim 1, further comprising:
providing visual programming options within the GUI based on the connectivity and functionality of the nodes.

11. The method as in claim 1, further comprising:
auto-placing and auto-connecting two or more nodes within the IoT IDE based on proximity of the two or more nodes to each other and based on their respective connectivity.

12. The method as in claim 1, further comprising:
populating the GUI with generically connectable and functional nodes selected from a group consisting of: sensors; actuators; actors; and cloud-based processors.

13. A tangible, non-transitory computer-readable media comprising program instructions, which when executed on a processor are configured to:
establish a graphical user interface (GUI) for an Internet of Things (IoT) integrated developer environment (IDE) with one or more visual developer tools;
provide nodes within the IoT IDE having connectivity and functionality, the nodes selected from a) discovered real nodes in communication with the IoT IDE or b) virtual nodes within the IoT IDE;
connect a plurality of the nodes within the IoT IDE as a logical and executable graph for a flow-based programming framework virtualized across one or more IoT layers that are undeveloped;
program nodes of at least one IoT layer of the one or more IoT layers based on respective connectivity and functionality, such that the logical and executable graph has one or more real and/or virtual inputs, one or more real and/or virtual processing functions, and one or more real and/or virtual actions;
deploy the node programming to one or more corresponding platform emulators configured to execute the node programming; and
simulate the logical and executable graph by executing the node programming to produce the one or more actions based on the one or more inputs and the one or more processing functions, the simulation including an abstraction of one or more of the IoT layers that are different than the at least one IoT layer by emulating functionality to produce an outcome necessary for remaining developed IoT layers.

14. The computer-readable media as in claim 13, wherein the program instructions are further configured to:
scale-up the graph into a larger graph.

15. The computer-readable media as in claim 13, wherein the program instructions are further configured to:
deploying the graph into a real-world platform for operation of node programming on one or more real-world devices.

16. The computer-readable media as in claim 15, wherein the program instructions are further configured to:
provide maintenance and service access to the deployed graph in a real-time, real-world environment.

17. An apparatus, comprising:
a processor adapted to execute one or more processes; and
a memory configured to store a process executable by the processor, the process when executed operable to:
establish a graphical user interface (GUI) for an Internet of Things (IoT) integrated developer environment (IDE) with one or more visual developer tools;
provide nodes within the IoT IDE having connectivity and functionality, the nodes selected from a) discovered real nodes in communication with the IoT IDE or b) virtual nodes within the IoT IDE;
connect a plurality of the nodes within the IoT IDE as a logical and executable graph for a flow-based programming framework virtualized across one or more IoT layers that are undeveloped;
program nodes of at least one IoT layer of the one or more IoT layers based on respective connectivity and functionality, such that the logical and executable graph has one or more real and/or virtual inputs, one or more real and/or virtual processing functions, and one or more real and/or virtual actions;
deploy the node programming to one or more corresponding platform emulators configured to execute the node programming; and
simulate the logical and executable graph by executing the node programming to produce the one or more actions based on the one or more inputs and the one or more processing functions, the simulation including an abstraction of one or more of the IoT layers that are different than the at least one IoT layer by emulating functionality to produce an outcome necessary for remaining developed IoT layers.

* * * * *